United States Patent
Yamamoto et al.

(10) Patent No.: US 8,012,625 B2
(45) Date of Patent: *Sep. 6, 2011

(54) NON-AQUEOUS ELECTROLYTE SECONDARY CELL

(75) Inventors: Satoshi Yamamoto, Moriguchi (JP); Nobumichi Nishida, Moriguchi (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 915 days.

This patent is subject to a terminal disclaimer.

(21) Appl. No.: 11/941,252

(22) Filed: Nov. 16, 2007

(65) Prior Publication Data

US 2008/0118839 A1    May 22, 2008

(30) Foreign Application Priority Data

Nov. 16, 2006  (JP) ................................ 2006-309799

(51) Int. Cl.
*H01M 4/48*  (2010.01)

(52) U.S. Cl. ............... 429/231.3; 429/231.1; 429/231.6; 429/231.5; 429/218.1

(58) Field of Classification Search ............... 429/231.3, 429/231.1, 231.6, 231.5, 218.1
See application file for complete search history.

(56) References Cited

U.S. PATENT DOCUMENTS

| | | | |
|---|---|---|---|
| 4,465,747 A | 8/1984 | Evans | |
| 5,686,203 A * | 11/1997 | Idota et al. | 429/231.3 |
| 5,928,812 A | 7/1999 | Xue | |
| 5,962,167 A * | 10/1999 | Nakai et al. | 429/231.1 |
| 6,582,852 B1 | 6/2003 | Gao et al. | |
| 6,949,233 B2 * | 9/2005 | Kweon et al. | 429/231.3 |
| 2005/0069774 A1 | 3/2005 | Miyazaki et al. | |
| 2006/0115733 A1 | 6/2006 | Nishida et al. | |
| 2006/0194110 A1 | 8/2006 | Miyazaki et al. | |
| 2006/0194114 A1 | 8/2006 | Saito | |
| 2006/0216605 A1 * | 9/2006 | Shirakata et al. | 429/231.3 |

FOREIGN PATENT DOCUMENTS

| | | |
|---|---|---|
| JP | 09-306547 A | 11/1997 |
| JP | 10-154532 A | 6/1998 |
| JP | 2003-308842 A | 10/2003 |
| JP | 2005-071641 A | 3/2005 |
| JP | 2005-129489 A | 5/2005 |
| WO | WO 2007/139130 A1 | 12/2007 |

OTHER PUBLICATIONS

European Search Report dated Mar. 18, 2008, issued in corresponding European application No. 07120633.

English Abstract of the Chinese Reason for Refusal dated Jan. 12, 2011, issued in corresponding Chinese Patent Application No. 200710142419.0.

* cited by examiner

*Primary Examiner* — Laura Weiner

(74) *Attorney, Agent, or Firm* — Westerman, Hattori, Daniels & Adrian, LLP

(57) ABSTRACT

The present invention aims to provide a non-aqueous electrolyte secondary cell having high capacity and capable of preventing elution of cobalt and decomposition of the electrolyte. This aim can be accomplished by providing a non-aqueous electrolyte secondary cell comprising a positive electrode having a positive electrode active material, an negative electrode having an negative electrode active material, and non-aqueous electrolyte, wherein the positive electrode active material comprises lithium cobalt oxide to which at least one material selected from the group consisting of Mg, Al, Ti, and Zr was added, and the positive electrode comprises lithium phosphate.

2 Claims, No Drawings

NON-AQUEOUS ELECTROLYTE SECONDARY CELL

BACKGROUND OF THE INVENTION (1) Field of the Invention

The present invention relates to an improvement of a non-aqueous electrolyte secondary cell designed for the purpose of improving preservation characteristics and cycle characteristics.

(2) Description of the Prior Art

There has been a rapid reduction in size and weight of mobile information terminals such as mobile phones and notebook personal. As the driving power sources for the terminals, non-aqueous electrolyte secondary cells, which have a high energy density and capacity, are widely used.

In recent years, higher capacity is required of the cells. In view of this, such a positive electrode active material is used that is charged to a higher potential than usual in an attempt to increase the use efficiency of the positive electrode active material.

However, when lithium cobalt oxide, generally used as the positive electrode active material, is charged to a potential higher than 4.3V with the respect to lithium, in particular, cobalt is eluted to the non-aqueous electrolyte in a high-temperature condition, and the eluted cobalt is deposited on a surface of the negative electrode, so that the deposited cobalt exerts a negative effect on the preservation characteristics and cycle characteristics. Also, in a higher potential condition (higher than 4.3V with the respect to lithium), the non-aqueous electrolyte is decomposed easily than in a conventional potential condition. The decomposition of the non-aqueous electrolyte causes generation of gas and then the generated gas hinders a smooth discharge and charge reaction, causing further deterioration in preservation characteristics and cycle characteristics.

In this connection, the techniques intended to contain lithium phosphate in the non-aqueous electrolyte cell for the purpose of improving the cell characteristics are proposed in Patent Documents 1-4 listed below:

Patent Document 1: JP unexamined patent publication No. 2003-308842,

Patent Document 2: JP unexamined patent publication No. 2005-71641,

Patent Document 3: JP unexamined patent publication No. 10-154532, and

Patent Document 4: JP unexamined patent publication No. 9-306547.

However, these techniques have a problem that when the positive electrode is charged to a potential higher than 4.3V with the respect to lithium, the elution of the cobalt and the decomposition of the electrolytic solution cannot be prevented sufficiently.

SUMMARY OF THE INVENTION

In view of the forgoing and other problems, it is an object of the present invention to provide a non-aqueous electrolyte secondary cell having high capacity and excellent preservation characteristics and cycle characteristics.

In order to accomplish the above and other object, a non-aqueous electrolyte secondary cell according to the present invention is configured as follows.

A non-aqueous electrolyte secondary cell comprising: a positive electrode having a positive electrode active material; a negative electrode having an negative electrode active material; and non-aqueous electrolyte, wherein: the positive electrode active material comprises lithium cobalt oxide having added therein at least one material selected from the group consisting of Mg, Al, Ti, and Zr; and the positive electrode comprises lithium phosphate.

According to the composition described above, the different metal element (Mg, Al, Ti, Zr) contained in the lithium cobalt oxide serves to provide improved stability of the crystal structure of the lithium cobalt oxide in a high potential condition (higher than 4.3V with respect to lithium), so that the elution of the cobalt to the non-aqueous electrolyte and the decomposition of the non-aqueous electrolyte are prevented effectively. In addition, the lithium phosphate contained in the positive electrode serves to decrease reactivity between the lithium cobalt oxide in which the different element (Mg, Al, Ti, Zr) is added and the non-aqueous electrolyte. These effects operate synergistically so that the elution of the cobalt to the non-aqueous electrolyte and the decomposition of the non-aqueous electrolyte can be inhibited effectively. It is to be noted here that when either the feature that the different element (Mg, Al, Ti, Zr) is contained in the lithium cobalt oxide or the feature that lithium phosphate is contained in the positive electrode is lacked, the effects of the invention cannot be obtained sufficiently.

It is to be noted here that to obtain the effects of the invention sufficiently, a proportion of the lithium cobalt oxide containing the different element (Mg, Al, Ti, Zr) is preferably not less than 50 mass % of a total of the positive electrode active material, or further preferably not less than 80 mass %, or most preferably 100 mass %.

In the composition described above, an amount of lithium phosphate added may be delimited to be within the range of 0.01-5 parts by mass where a total of the positive electrode active material and lithium phosphate added is taken as 100 parts by mass.

When a less amount of lithium phosphate is added to the positive electrode, the effect resulting from the addition of the lithium phosphate cannot be obtained sufficiently. On the other hand, when an excess amount of lithium phosphate is added to the positive electrode, since the lithium phosphate itself does not contribute to the discharge reaction, an amount of positive electrode active material that contributes to the discharge and charge is reduced and thereby the discharge capacity is reduced. In view of this, an amount of lithium phosphate added to the positive electrode should preferably be limited to be within the range specified above.

In the composition described above, the lithium cobalt oxide in which different element is added may be represented by a general chemical formula $Li_aCO_{1-x}M_xO_2$ (where $0 \leq a \leq 1.1$, $0.01 \leq x \leq 0.05$, and M is at least one material of Mg, Al, Ti, and Zr).

When a less amount of different element (Mg, Al, Ti, Zr) is contained in the lithium cobalt oxide, an insufficient effect is provided. On the other hand, when an excess amount of different element (Mg, Al, Ti, Zr) is contained in the lithium cobalt oxide, reduction in discharge capacity is incurred. In view of this, an amount x of the different element M contained in the lithium cobalt oxide should preferably be limited to the range as expressed by the chemical formula described above.

It is to be noted here that the effect resulting from the composition described above is provided remarkably when a potential of the positive electrode active material is not less than 4.4V with respect to lithium. However, when a potential of the positive electrode active material is increased over 4.6V with respect to lithium, the elution of the cobalt cannot be prevented sufficiently. It is desirable, therefore, that the present invention is applied to the cells comprising the positive electrode active material whose potential is in the range of 4.4V to 4.6V with respect to lithium.

DESCRIPTION OF THE PREFERRED EMBODIMENTS

Preferred embodiments of the present invention will now be described in detail according to Examples. It will be appreciated that the present invention is not to be limited by these embodiments, and that amendments and modifications are possible without departing from the scope of the invention.

EXAMPLE 1

(Production of the Positive Electrode)

Cobalt (Co), Magnesium (Mg), Aluminum (Al), and Zirconium (Zr) were co-precipitated and tricobalt tetraoxide containing magnesium, aluminum, and zirconium was prepared by a thermal decomposition reaction. Then, the tricobalt tetroxide was mixed with lithium carbonate and calcined at 850° C. for 24 hours in an air atmosphere. Thereafter, it was pulverized in a mortar until the particles had an average particle diameter of 14 µm, to thereby produce lithium cobalt oxide containing magnesium, aluminum, and zirconium ($LiCo_{0.973}Mg_{0.005}Al_{0.02}Zr_{0.002}O_2$) as a positive electrode active material. Then, lithium phosphate ($Li_3PO_4$) having an average particle diameter of 5 µm was added and mixed in the obtained lithium cobalt oxide in a mass ratio of 99:1.

Then, a positive active material slurry was obtained by mixing 94 parts by mass of the mixture, 3 parts by mass of carbon powder used as electrical conducting material, 3 parts by mass of polyvinylidene-fluoride (PVdF) used as a binder, and N-methyl-2-pyrrolidone. Then, this active material slurry was applied on both sides of a positive electrode substrate made of an aluminum foil (20 µm thick). After having been dried, this positive substrate was extended to have a thickness of 130 mm by applying pressure to thereby produce a positive electrode of 30×450 mm.

(Production of Negative Electrode)

An active material slurry was obtained by mixing 95 parts by mass of a negative electrode active material made of graphite, 3 parts by mass of a thickener made of carboxymethyl cellulose, 2 parts by mass of a binder made of styrene-butadiene rubber, and water. Then, this negative electrode active slurry was applied on both sides of a negative electrode substrate made of a copper foil (20 µm thick). After having been dried, this negative substrate was extended to have a thickness of 150 mm by applying pressure to thereby produce an negative electrode of 32×460 mm.

It is to be noted that a potential of the graphite is 0.1V with respect to lithium. Also, an amount of positive electrode active material filled and an amount of negative electrode active material filled were adjusted so that a charging capacity ratio of the negative electrode to the positive electrode (charging capacity of negative electrode/charging capacity of positive electrode) could be 1.25 with reference to a design potential of the positive electrode active material (4.5V specified in this Example, with respect to lithium, and 4.4V in voltage).

(Production of Electrode)

The positive and negative electrodes were wound with a separator made of finely porous film of olefin and provided between the electrodes, thus preparing a electrode assembly.

(Adjustment of Non-Aqueous Electrolyte)

Ethylene carbonate (EC) and dimethyl carbonate (DMC) were mixed at a volume ratio of 30:70 (25° C.) thus preparing a non-aqueous solvent mixture. Into this mixture was dissolved 1M (mol/l) of $LiPF_6$ thus preparing an non-aqueous electrolyte.

(Assembly of the Cell)

The above prepared electrode assembly was inserted into an outer casing, which was then impregnated with the electrolyte. Then, the opening of the outer casing was sealed, thus obtaining non-aqueous electrolyte secondary cell according to example 1.

EXAMPLE 2

A non-aqueous electrolyte secondary cell according to example 2 was prepared in the same manner as in example 1 except that the lithium cobalt oxide containing magnesium, aluminum, and zirconium and lithium phosphate were mixed in a mass ratio of 99.995:0.005.

EXAMPLE 3

A non-aqueous electrolyte secondary cell according to example 3 was prepared in the same manner as in example 1 except that the lithium cobalt oxide containing magnesium, aluminum, and zirconium and lithium phosphate were mixed in a mass ratio of 99.99:0.01.

EXAMPLE 4

A non-aqueous electrolyte secondary cell according to example 4 was prepared in the same manner as in example 1 except that the lithium cobalt oxide containing magnesium, aluminum, and zirconium and lithium phosphate were mixed in a mass ratio of 99.5:0.5.

EXAMPLE 5

A non-aqueous electrolyte secondary cell according to example 5 was prepared in the same manner as in example 1 except that the lithium cobalt oxide containing magnesium, aluminum, and zirconium and lithium phosphate were mixed in a mass ratio of 97:3.

EXAMPLE 6

A non-aqueous electrolyte secondary cell according to example 6 was prepared in the same manner as in example 1 except that the lithium cobalt oxide containing magnesium, aluminum, and zirconium and lithium phosphate were mixed in a mass ratio of 95:5.

EXAMPLE 7

A non-aqueous electrolyte secondary cell according to example 7 was prepared in the same manner as in example 1 except that the lithium cobalt oxide containing magnesium, aluminum, and zirconium and lithium phosphate were mixed in a mass ratio of 93:7.

EXAMPLE 8

A non-aqueous electrolyte secondary cell according to example 8 was prepared in the same manner as in example 1 except that $LiCo_{0.973}Mg_{0.005}Al_{0.02}Ti_{0.002}O_2$ was used as the positive electrode active material. It is to be noted that the addition of the different elements were performed by the same co-precipitation method as in example 1.

EXAMPLE 9

A non-aqueous electrolyte secondary cell according to example 9 was prepared in the same manner as in example 1 except that $LiCo_{0.98}Al_{0.02}O_2$ was used as the positive electrode active material. It is to be noted that the addition of the different elements were performed by the same co-precipitation method as in example 1.

EXAMPLE 10

A non-aqueous electrolyte secondary cell according to example 10 was prepared in the same manner as in example 1 except that $LiCo_{0.98}Mg_{0.02}O_2$ was used as the positive electrode active material. It is to be noted that the addition of the different elements were performed by the same co-precipitation method as in example 1.

EXAMPLE 11

A non-aqueous electrolyte secondary cell according to example 11 was prepared in the same manner as in example 1 except that $LiCo_{0.98}Zr_{0.02}O_2$ was used as the positive electrode active material. It is to be noted that the addition of the different elements were performed by the same co-precipitation method as in example 1.

EXAMPLE 12

A non-aqueous electrolyte secondary cell according to example 12 was prepared in the same manner as in example 1 except that $LiCo_{0.98}Ti_{0.02}O_2$ was used as the positive electrode active material. It is to be noted that the addition of the different elements were performed by the same co-precipitation method as in example 1.

EXAMPLE 13

A non-aqueous electrolyte secondary cell according to example 13 was prepared in the same manner as in example 1 except that $LiCo_{0.978}Al_{0.02}Zr_{0.002}O_2$ was used as the positive electrode active material. It is to be noted that the addition of the different elements were performed by the same co-precipitation method as in example 1.

EXAMPLE 14

A non-aqueous electrolyte secondary cell according to example 14 was prepared in the same manner as in example 1 except that $LiCo_{0.978}Mg_{0.02}Ti_{0.002}O_2$ was used as the positive electrode active material. It is to be noted that the addition of the different elements were performed by the same co-precipitation method as in example 1.

EXAMPLE 15

A non-aqueous electrolyte secondary cell according to example 15 was prepared in the same manner as in example 1 except that $LiCo_{0.975}Al_{0.02}Mg_{0.005}O_2$ was used as the positive electrode active material. It is to be noted that the addition of the different elements were performed by the same co-precipitation method as in example 1.

EXAMPLE 16

A non-aqueous electrolyte secondary cell according to example 16 was prepared in the same manner as in example 1 except that $LiCo_{0.995}Al_{0.005}O_2$ was used as the positive electrode active material. It is to be noted that the addition of the different elements were performed by the same co-precipitation method as in example 1.

EXAMPLE 17

A non-aqueous electrolyte secondary cell according to example 17 was prepared in the same manner as in example 1 except that $LiCo_{0.99}Al_{0.01}O_2$ was used as the positive electrode active material. It is to be noted that the addition of the different elements were performed by the same co-precipitation method as in example 1.

EXAMPLE 18

A non-aqueous electrolyte secondary cell according to example 18 was prepared in the same manner as in example 1 except that $LiCo_{0.95}Al_{0.05}O_2$ was used as the positive electrode active material. It is to be noted that the addition of the different elements were performed by the same co-precipitation method as in Example 1.

EXAMPLE 19

A non-aqueous electrolyte secondary cell according to example 19 was prepared in the same manner as in example 1 except that $LiCo_{0.93}Al_{0.07}O_2$ was used as the positive electrode active material. It is to be noted that the addition of the different elements were performed by the same co-precipitation method as in example 1.

COMPARATIVE EXAMPLE 1

A non-aqueous electrolyte secondary cell according to comparative example 1 was prepared in the same manner as in example 1 except that $LiCoO_2$ was used as the positive electrode active material and no lithium phosphate was mixed.

COMPARATIVE EXAMPLE 2

A non-aqueous electrolyte secondary cell according to comparative example 2 was prepared in the same manner as in example 3 except that $LiCoO_2$ was used as the positive electrode active material.

COMPARATIVE EXAMPLE 3

A non-aqueous electrolyte secondary cell according to comparative example 3 was prepared in the same manner as in example 1 except that $LiCoO_2$ was used as the positive electrode active material.

COMPARATIVE EXAMPLE 4

A non-aqueous electrolyte secondary cell according to comparative example 4 was prepared in the same manner as in example 6 except that $LiCoO_2$ was used as the positive electrode active material.

COMPARATIVE EXAMPLE 5

A non-aqueous electrolyte secondary cell according to comparative example 5 was prepared in the same manner as in example 1 except that no lithium phosphate was mixed.

COMPARATIVE EXAMPLE 6

A non-aqueous electrolyte secondary cell according to comparative example 6 was prepared in the same manner as in example 1 except that $LiCo_{0.99}Mn_{0.01}O_2$ was used as the positive electrode. It is to be noted that the addition of the different elements were performed by the same co-precipitation method as in example 1.

In the group of the cells described above, amounts of different elements (Al, Zr, Ti, Mn) added to the lithium cobalt oxide, except Magnesium contained therein, were analyzed by the ICP (Inductivity Coupled Plasma) method. An amount of magnesium added was analyzed by the atomic absorption method.

Also, an amount of cobalt contained in the lithium cobalt oxide was analyzed by the following titration method and an amount of lithium contained was analyzed by the following flame photometry.

Titration Method

After the sample was dissolved in hydrochloric acid, it was dried and then diluted by adding water. After ascorbic acid was added to it, titration was performed by using a standard solution of EDTA (Ethylenediamine tetraacetate).

Flame Photometry

After the sample was dissolved in hydrochloric acid, it was dried and diluted by adding water. Then, the quantity of lithium was determined by measuring the flame photometric intensity of 670.8 nm.

[Cell Characteristic Test]

The cells thus prepared were subjected to cycle characteristic test and a high-temperature preservation test under the following conditions. The results are shown in Table 1.

[Cycle Characteristics Test]

Charging Conditions: Each cell was charged at a constant current of 1.0 It (700 mA) to a voltage of 4.4 V, then at a constant voltage of 4.4 V to a current of 20 mA at 25° C.;

Discharging Conditions: Each cell was charged at a constant current of 1.0 It (700 mA) to a voltage of 2.75 V at 25° C.

Cycle Characteristics (%): (500th cycle discharge capacity/1st cycle discharge capacity)×100.

[High-Temperature Preservation Characteristics Test]

Charging Conditions: Each cell was charged at a constant current of 1.0 It (700 mA) to a voltage of 4.4 V, then at a constant voltage of 4.4 V to a current of 20 mA at 25° C.

Preservation conditions: 80° C., 48 hours (Measurement of Cobalt Eluted)

The cobalt deposited on the negative electrode was analyzed by the ICP (Inductivity Coupled Plasma) to determine a quantity of cobalt deposited. The results are shown in the following Table 1, expressing as a relative value to that of Comparative Example 1 which is taken as 100.

(Measurement of Gas Generation)

The gas generated was analyzed by gas chromatography to determine a quantity of gas generated. It is added in this connection that major components of the gas generated were $CO_2$, CO, and $CH_4$. The results are shown in the following Table 1, expressing as a relative value to that of Comparative Example 1 which is taken as 100.

TABLE 1

| | Amount of different elements added (mol %) | Amount of $Li_3PO_4$ added (mass %) | Cell capacity (mAh) | Preservation characteristics | | Cycle characteristics (%) |
|---|---|---|---|---|---|---|
| | | | | Amount of Co eluted | Amount of gas generated | |
| Compara. Ex. 1 | — | 0 | 931 | 100 | 100 | 28 |
| Compara. Ex. 2 | — | 0.01 | 931 | 96 | 95 | 30 |
| Compara. Ex. 3 | — | 1 | 920 | 86 | 94 | 33 |
| Compara. Ex. 4 | — | 5 | 875 | 79 | 91 | 40 |
| Compara. Ex. 5 | Al: 2.0, Mg: 0.5, Zr: 0.2 | 0 | 911 | 65 | 75 | 38 |
| Example 2 | Al: 2.0, Mg: 0.5, Zr: 0.2 | 0.005 | 910 | 60 | 70 | 50 |
| Example 3 | Al: 2.0, Mg: 0.5, Zr: 0.2 | 0.01 | 911 | 22 | 35 | 56 |
| Example 4 | Al: 2.0, Mg: 0.5, Zr: 0.2 | 0.5 | 906 | 16 | 33 | 58 |
| Example 1 | Al: 2.0, Mg: 0.5, Zr: 0.2 | 1 | 878 | 7 | 21 | 71 |
| Example 5 | Al: 2.0, Mg: 0.5, Zr: 0.2 | 3 | 900 | 6 | 22 | 72 |
| Example 6 | Al: 2.0, Mg: 0.5, Zr: 0.2 | 5 | 878 | 5 | 21 | 72 |
| Example 7 | Al: 2.0, Mg: 0.5, Zr: 0.2 | 7 | 865 | 5 | 24 | 65 |
| Example 8 | Al: 2.0, Mg: 0.5, Ti: 0.2 | 1 | 810 | 10 | 34 | 71 |
| Example 9 | Al: 2.0 | 1 | 911 | 15 | 25 | 62 |
| Example 10 | Mg: 2.0 | 1 | 910 | 18 | 27 | 60 |
| Example 11 | Zr: 2.0 | 1 | 909 | 20 | 27 | 63 |
| Example 12 | Ti: 2.0 | 1 | 907 | 20 | 25 | 60 |
| Example 13 | Al: 2.0, Zr: 0.2 | 1 | 905 | 14 | 26 | 61 |

TABLE 1-continued

|  | Amount of different elements added (mol %) | Amount of Li$_3$PO$_4$ added (mass %) | Cell capacity (mAh) | Preservation characteristics | | Cycle characteristics (%) |
|---|---|---|---|---|---|---|
|  |  |  |  | Amount of Co eluted | Amount of gas generated |  |
| Example 14 | Mg: 2.0, Ti: 0.2 | 1 | 908 | 15 | 27 | 59 |
| Example 15 | Al: 2.0, Mg: 0.5 | 1 | 903 | 17 | 28 | 65 |
| Example 16 | Al: 0.5 | 1 | 925 | 55 | 65 | 52 |
| Example 17 | Al: 1.0 | 1 | 910 | 30 | 31 | 62 |
| Example 18 | Al: 5.0 | 1 | 860 | 18 | 25 | 70 |
| Example 19 | Al: 7.0 | 1 | 810 | 14 | 25 | 61 |
| Compara. Ex. 6 | Mn: 1.0 | 1 | 810 | 85 | 95 | 35 |

It can be seen from TABLE 1 that Example 1 according to which the different elements (Al, Mg, Zr) were added to the lithium cobalt oxide and also the lithium phosphate (Li$_3$PO$_4$) was added to the positive electrode and which provided the results that the quantity of cobalt (Co) eluted was 7, that the amount of gas generated was 21, and that the cycle characteristics was 71% is superior to Comparative Examples 1-5 according to which either or neither the addition of the different elements to the lithium cobalt oxide or/nor the addition of lithium phosphate to the positive electrode were adopted and which provided the results that the amount of cobalt eluted were from 65 to 100, that the amount of gas generated were from 75 to 100, and that the cycle characteristics were from 28 to 40%.

This is probably due to the following operations. The different elements such as Magnesium (Mg), Aluminum (Al), and Zirconium (Zr) added to the lithium cobalt oxide serve to provide improved stability of the crystal structure of the lithium cobalt oxide in a high potential condition so that the elution of the positive electrode active material (cobalt) to the non-aqueous electrolyte and the decomposition of the non-aqueous electrolyte can be prevented. In addition to this, the lithium phosphate contained in the positive electrode serves to inhibit the reaction between the different elements (Mg, Al, Zr)-containing lithium cobalt oxide and the non-aqueous electrolyte and thereby inhibit the elution of the positive electrode active material (cobalt) to the non-aqueous electrolyte and the decomposition of the non-aqueous electrolyte is inhibited. As a result of this, the lithium phosphate and the different elements operate synergistically so that the elution of the cobalt and the decomposition of the non-aqueous electrolyte are inhibited effectively. On the other hand, when either or both of the features described above is lacked, the elution of the cobalt and the decomposition of the non-aqueous electrolyte cannot be inhibited sufficiently.

Also, it can be seen from Examples 1-7 that when the amount of the lithium phosphate added to the positive electrode was less than 0.01 mass %, the elution of the cobalt and the generation of gas caused by the decomposition of the non-aqueous electrolyte cannot be inhibited sufficiently (Cf. Example 2), while on the other hand, when the amount of the lithium phosphate added to the positive electrode was more than 5 mass %, reduction in discharge capacity is incurred (Cf. Example 7).

This is probably due to the following operations. When a less amount of lithium phosphate is added to the positive electrode, the elution of the cobalt and the generation of gas caused by the decomposition of the electrolyte cannot be inhibited sufficiently. On the other hand, when a large amount of lithium phosphate is added to the positive electrode, since the lithium phosphate itself does not contribute to the discharge reaction, an amount of lithium cobalt oxide that contributes to the discharge and charge is reduced and thereby the discharge capacity is reduced. In view of this, an amount of lithium phosphate added to the positive electrode is preferably within the range of 0.01-5 parts by mass where a total mass of the positive electrode active material and lithium phosphate added is taken as 100 parts by mass.

Also, it can be seen from the comparison between Examples 9-12 and Comparative Example 6 that Magnesium (Mg), Aluminum (Al), Zirconium (Zr), and titanium (Ti) are desirable for the different elements added to the lithium cobalt acid, but Manganese (Mn) is undesirable therefor.

Also, it can be seen from Examples 9 and 16-19 that an amount of the different elements added is less than 1.0 mol %, the elution of the cobalt and the generation of gas caused by the decomposition of the electrolyte cannot be inhibited sufficiently (Cf. Example 16). On the other hand, when an amount of the lithium phosphate added is more than 5.0 mol %, reduction of the discharge capacity is incurred (Cf. Example 19). In view of this, an amount of different elements added to the lithium cobalt oxide is preferably within the range of 1.0-5.0 mol %.

(Supplementary Remarks)

In addition to ethylene carbonate and dimethyl carbonate, propylene carbonate, butylene carbonate, diethyl carbonate, ethyl methyl carbonate, γ-butyrolactone, γ-valerolactone, tetrahydrofuran, 1,2-dimethoxyethane, 1,3-dioxysoran, 2-methoxytetrahydrofuran, and diethyl ether may be used as a non-aqueous solvent.

Also, in addition to LiPF$_6$, one material or mixture of two or more materials including for example LiN(C$_2$F$_5$SO$_2$)$_2$, LiN(CF$_3$SO$_2$)$_2$, LiClO$_4$, LiBF$_4$, may be used as the electrolyte salt.

What is claimed is:

1. A non-aqueous electrolyte secondary cell comprising:
   a positive electrode having a positive electrode active material;
   a negative electrode having a negative electrode active material; and
   non-aqueous electrolyte,
   wherein:
   the positive electrode active material comprises lithium cobalt oxide represented by a chemical formula Li$_a$Co$_{1-x}$M$_x$O$_2$ (where $0 < a \leq 1.1$, $0.01 \leq x \leq 0.05$ and M is at least one selected from the group consisting of Mg, Al, Ti, and Zr) and the positive electrode comprises lithium phosphate represented by the chemical formula $Li_3PO_4$, and wherein an amount of lithium phosphate added is within the range of 0.01-5 parts by mass where a total of the positive electrode active material and lithium phosphate added is taken as 100 parts by mass.

2. The non-aqueous electrolyte secondary cell according to claim 1, wherein a potential of the positive electrode active material is in the range of 4.4-4.6V with respect to lithium.

* * * * *